US012560488B2

(12) United States Patent
Lee et al.

(10) Patent No.: US 12,560,488 B2
(45) Date of Patent: Feb. 24, 2026

(54) SECONDARY BATTERY TEMPERATURE MEASURING DEVICE

(71) Applicant: SK On Co., Ltd., Seoul (KR)

(72) Inventors: Keun Jun Lee, Daejeon (KR); Kyu Beom Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 370 days.

(21) Appl. No.: 18/314,142

(22) Filed: May 9, 2023

(65) Prior Publication Data

US 2023/0366744 A1     Nov. 16, 2023

(30) Foreign Application Priority Data

May 13, 2022     (KR) ........................ 10-2022-0059048

(51) Int. Cl.
*G01K 1/14*          (2021.01)
*H01M 10/48*          (2006.01)
(52) U.S. Cl.
CPC ............ *G01K 1/14* (2013.01); *H01M 10/486* (2013.01)
(58) Field of Classification Search
CPC ............ G01K 1/14; G01K 1/16; G01K 13/00; H01M 10/486; H01M 10/4285; H01M 10/0481; H01M 10/052; H01M 10/058; H01M 50/178; Y02E 60/10
See application file for complete search history.

(56) References Cited

U.S. PATENT DOCUMENTS

| | | | | |
|---|---|---|---|---|
| 2016/0126601 A1* | 5/2016 | Ichikawa | ............ | H01M 10/486 |
| | | | | 374/152 |
| 2020/0259155 A1* | 8/2020 | Lee | ...................... | H01M 10/425 |
| 2021/0226265 A1* | 7/2021 | Lee | ...................... | H01M 10/486 |
| 2022/0181752 A1* | 6/2022 | North | ................. | H01M 50/503 |
| 2022/0255110 A1* | 8/2022 | Song | ................... | H01M 50/105 |
| 2022/0294023 A1* | 9/2022 | Hara | ................. | H01M 10/0587 |
| 2023/0045364 A1* | 2/2023 | Lee | ...................... | H01M 10/48 |
| 2023/0057926 A1* | 2/2023 | Kim | ...................... | H01M 10/52 |
| 2023/0073871 A1* | 3/2023 | Jeon | ................... | H01M 50/242 |
| 2023/0083153 A1* | 3/2023 | Jin | .................... | H01M 10/0525 |
| | | | | 29/525.02 |
| 2024/0133761 A1* | 4/2024 | Hwang | .............. | G01L 19/0092 |
| 2024/0230444 A9* | 7/2024 | Hwang | ................. | H01M 10/42 |

FOREIGN PATENT DOCUMENTS

| | | |
|---|---|---|
| KR | 10-2020-0067007 A | 6/2020 |
| KR | 10-2021-0043895 A | 4/2021 |
| KR | 10-2022-0011319 A | 1/2022 |

* cited by examiner

*Primary Examiner* — Laura Martin
*Assistant Examiner* — Philip L Cotey
(74) *Attorney, Agent, or Firm* — IP & T GROUP LLP

(57)          ABSTRACT

A secondary battery temperature measuring device according to the present disclosure includes a jig configured to pressurize a secondary battery, and a temperature measuring member configured to measure a temperature of the secondary battery, wherein the jig includes a hole configured to accommodate the temperature measuring member, thereby providing the secondary battery temperature measuring device capable of stable and accurate temperature measurement when evaluating high-temperature long-term storage of the secondary battery.

13 Claims, 4 Drawing Sheets

Gas generation inside
secondary battery during
high-temperature evaluation

200

300

400

500

SECONDARY BATTERY TEMPERATURE MEASURING DEVICE

CROSS-REFERENCE TO RELATED APPLICATION

The present application claims priority under 35 U.S.C. § 119(a) to Korean patent application number 10-2022-0059048 filed on May 13, 2022, in the Korean Intellectual Property Office, the entire disclosure of which is incorporated by reference herein.

BACKGROUND

1. Technical Field

The present disclosure relates to a temperature measuring device capable of stably and accurately measuring temperature of a secondary battery.

2. Related Art

With development of electronics, communications, and space industries, the demand for secondary batteries as an energy power source is rapidly increasing. In particular, as importance of global eco-friendly policies is emphasized, the electric vehicle market is growing rapidly, and research and development on secondary batteries are actively carried out at home and abroad.

Among various secondary batteries, research and development on lithium secondary batteries with high discharge voltage and energy density are the most active. Such a lithium secondary battery is manufactured by accommodating an electrode assembly including an anode, a cathode, and a separator in a pouch-type exterior member having high flexibility, and then heat-sealing the edges of the pouch-type exterior member.

In the lithium secondary battery, defective products are detected or various performances are evaluated during the manufacturing process, and temperature is typically measured to evaluate high-temperature long-term storage properties.

FIG. 1 schematically illustrates a configuration of a secondary battery temperature measuring device according to a related art.

Referring to FIG. 1, a secondary battery includes an electrode assembly 11 and an electrode tab 13, and a temperature measuring device 100 includes a configuration in which the secondary battery is clamped between jigs 10 and then a temperature measuring member 12 is attached to a terrace portion between the electrode tab 13 and the jigs 10. However, during high-temperature long-term evaluation, a phenomenon in which the terrace portion of the electrode tab 13 swells due to gas generation inside the secondary battery occurs, and due to a change in the surface to which the temperature measuring member 12 is attached, a problem occurred where the temperature measuring member 12 is detached from the terrace portion. In other words, the secondary battery temperature measuring device according to the related art for evaluating the high-temperature long-term storage of the secondary battery had a problem in that stability was deteriorated and accurate temperature measurement was difficult.

Therefore, as a temperature measuring device for evaluating the high-temperature long-term storage of a secondary battery, a device capable of stable and accurate temperature measurement is required.

SUMMARY

Embodiments provide a secondary battery temperature measuring device capable of stably and accurately measuring temperature when evaluating high-temperature long-term storage of a secondary battery.

In accordance with an aspect of the present disclosure, there is provided a secondary battery temperature measuring device including a jig configured to pressurize a secondary battery, and a temperature measuring member configured to measure a temperature of the secondary battery, wherein the jig includes a hole configured to accommodate the temperature measuring member.

According to an embodiment, the jig may include a lower plate on which the secondary battery is seated and an upper plate configured to pressurize the secondary battery from an upper part.

According to an embodiment, the secondary battery may include an electrode assembly and an electrode tab extending from the electrode assembly, and the lower plate and the upper plate may clamp the electrode assembly.

According to an embodiment, the upper plate and the lower plate may include a thermally conductive metal material.

According to an embodiment, the upper plate may include a fixing member configured to fix the secondary battery.

According to an embodiment, the temperature measuring member may be adhered to an inner surface of the hole by a heat-resistant tape.

According to an embodiment, the temperature measuring member may include a connecting member, and the connecting member is drawn out to an outside of the hole.

According to an embodiment, the hole may be formed in at least a part of the lower plate and the upper plate adjacent to the electrode tab.

According to an embodiment, the electrode tab may include a positive electrode tab and a negative electrode tab, and the temperature measuring member may be accommodated in the hole adjacent to the positive electrode tab.

According to an embodiment, at least one or more of the holes may be provided.

According to an embodiment, a thermally conductive polymer may be formed on at least a part of an outer periphery and an inner surface of the hole.

According to an embodiment, the temperature measuring member may be adhered to the thermally conductive polymer.

According to an embodiment, a cross section of the hole may include any one or more shapes of a polygon and a curve.

According to an embodiment, the hole may be formed in a central part of the upper plate.

According to an embodiment, the temperature measuring member may be in contact with the secondary battery.

A secondary batter temperature measuring device according to the present disclosure accommodates a temperature measuring member inside a hole formed in a jig, thereby having an effect of stably and accurately measuring temperature of a secondary battery even if the volume of a pouch changes due to gas generated inside the pouch accommodating an electrode assembly.

In addition, the secondary battery temperature measuring device according to the present disclosure has an effect of reducing the possibility of safety accidents by reducing the weight of the jig by forming various sizes and various number of holes in the jig. In addition, there is an effect of increasing convenience when moving the jig using the hole formed in the jig or clamping the secondary battery between the jigs.

In addition, the secondary battery temperature measuring device according to the present disclosure may prevent corrosion of the hole by forming a thermally conductive polymer on at least a part of an outer periphery and inner surface of the hole formed in the jig, and may stably fix the temperature measuring member inside the hole, thereby having an effect of accurately measuring the temperature of the secondary battery.

In addition, the secondary battery temperature measuring device according to the present disclosure not only may indirectly measure the temperature of the secondary battery by transferring heat generated from the secondary battery through the jig, but also have an effect of directly measuring the temperature of the secondary battery by the temperature measuring member accommodated in the hole being in contact with the surface of the secondary battery.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, a secondary battery temperature measuring device according to the present disclosure will be described in detail.

The secondary battery temperature measuring device according to the present disclosure includes a jig configured to pressurize a secondary battery, and a temperature measuring member configured to measure a temperature of the secondary battery, wherein the jig includes a hole configured to accommodate the temperature measuring member.

Figure 1:
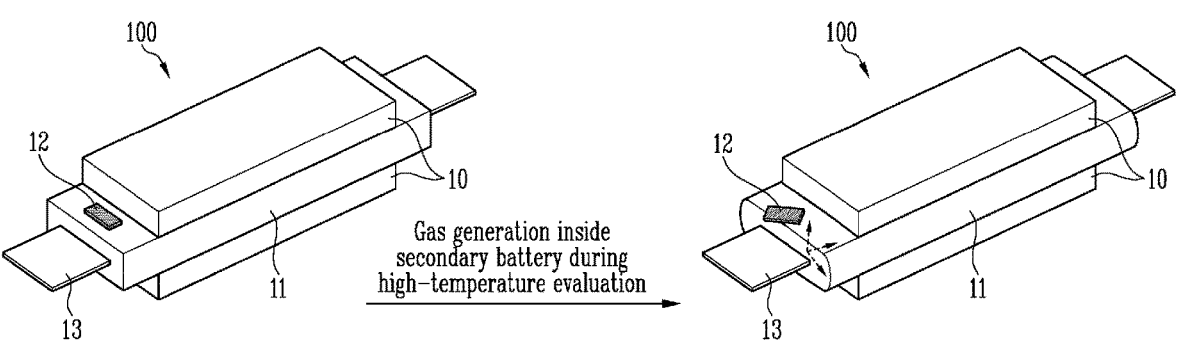
FIG. 1 schematically illustrates a configuration of a secondary battery temperature measuring device according to a related art.
Figure 2:
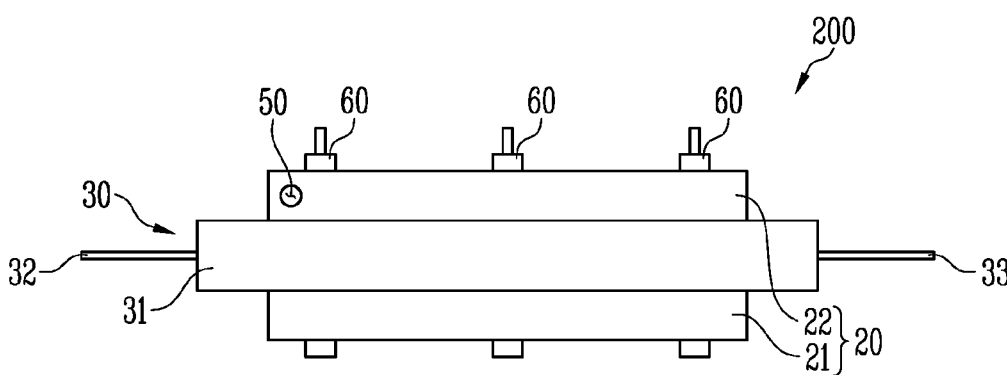
FIG. 2 schematically illustrates a side view and a perspective view of a temperature measuring device in accordance with an embodiment of the present disclosure.
Figure 2:
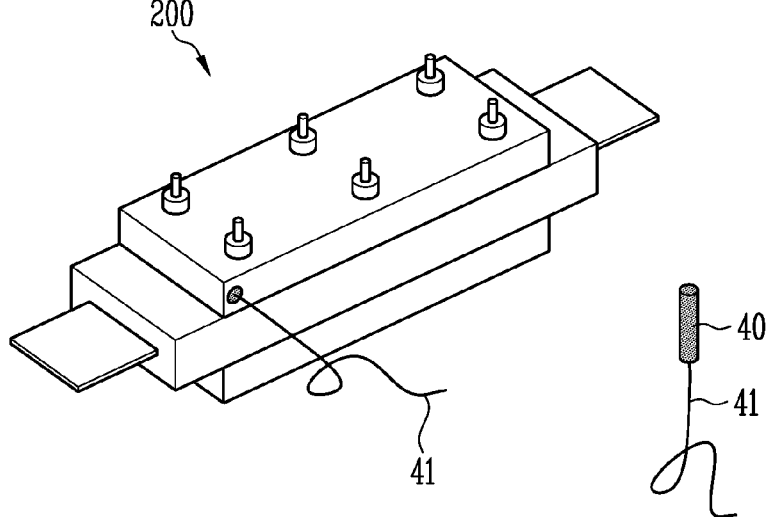

FIG. 2 schematically illustrates a side view and a perspective view of a temperature measuring device in accordance with an embodiment of the present disclosure.

Referring to FIG. 2, a temperature measuring device 200 according to an embodiment of the present disclosure includes a jig 20 configured to pressurize a secondary battery 30. The temperature measuring device 200 is a device for evaluating the high-temperature long-term storage of the secondary battery 30, and if necessary, the temperature measuring device 200 may be accommodated in a chamber to measure a temperature change of the secondary battery 30 under heating conditions.

The jig 20 may include a lower plate 21 on which the secondary battery 30 is seated and an upper plate 22 configured to pressurize the secondary battery 30 from an upper part. The lower plate 21 and the upper plate 22 encompass a case in which the secondary battery 30 is fixed or pressurized by positioning two arms in a direction facing each other. In the present disclosure, the temperature measurement of the secondary battery 30 is performed in a state where the secondary battery 30 is clamped between the lower plate 21 and the upper plate 22. The lower plate 21 and the upper plate 22 fix the position of the secondary battery 30 and serve to support so that the temperature of the secondary battery 30 may be accurately measured even if a volume change of the secondary battery 30 occurs. In other words, the lower plate 21 and the upper plate 22 serve to fix the state in which the secondary battery 30 is clamped. FIG. 2 illustrates that the lengths of the lower plate 21 and the upper plate 22 are smaller than the length of the secondary battery 30, but are not limited thereto, and the sizes of the lower plate 21 and the upper plate 22 may be adjusted in various ways within the range of measuring the temperature of the secondary battery 30.

The upper plate 22 and the lower plate 21 may include a thermally conductive metal material. The upper plate 22 and the lower plate 21 may serve to transfer heat generated from the secondary battery 30 to the temperature measuring member. Therefore, the upper plate 22 and the lower plate 21 preferably include a highly thermally conductive metal material, for example, may include a thermally conductive metal material such as aluminum, copper, iron.

The upper plate 22 may include a fixing member 60 configured to fix the secondary battery 30. The fixing member 60 serves to fix the secondary battery 30 clamped between the upper plate 22 and the lower plate 21, or remove the secondary battery 30 fixed between the upper plate 22 and the lower plate 21. The fixing member 60 may be formed on the upper part of the upper plate 22 and a plurality of the fixing members 60 may be formed. In addition, a durable material may be used as the fixing member 60, and a bolt and nut type structure may be used.

The secondary battery 30 may include an electrode assembly 31 and an electrode tab 32, 33 extending from the electrode assembly 31. In addition, the electrode assembly 31 may be in a form of being accommodated in a pouch.

The pouch serves to protect the electrode assembly 31 from the external environment. The pouch may include a water-resistant resin, and may be in the form of a film in which, for example, a polyolefin-based resin, a metal, a nylon resin, and a polyterephthalate resin are stacked.

The electrode assembly 31 may include a structure i which a cathode, an anode and a separator interposed between the cathode and the anode are stacked. The cathode may include a cathode active material in which lithium ions may be stored and extracted, and the anode may include an anode active material in which lithium ions may be stored and extracted. In addition, the cathode and anode may further include a binder and a conductive material in each of the cathode active material and the anode active material to improve mechanical stability and electrical conductivity. The separator may be configured to prevent an electrical short circuit between the cathode and the anode and to generate a flow of ions. The type of separator is not particularly limited, but may include a porous polymer film. The electrode assembly may be manufactured by stacking or zigzag stacking by alternately stacking a plurality of cathodes and anodes, and interposing a separator between the cathode and the anode.

The secondary battery 30 may further include an electrolyte. The electrolyte may be a non-aqueous electrolyte. The electrolyte may include a lithium salt and an organic solvent. For example, the organic solvent may include one or more selected from the group consisting of propylene carbonate (PC), ethylene carbonate (EC), diethyl carbonate (DEC), dimethyl carbonate (DMC), ethylmethyl carbonate (EMC), methylpropyl carbonate (MPC), dipropyl carbonate (DPC), vinylene carbonate (VC), dimethyl sulfoxide, acetonitrile, dimethoxyethane, diethoxyethane, sulfolane, gamma-butyrolactone, propylene sulfide, and tetrahydrofuran.

The lower plate 21 and the upper plate 22 may have a structure clamping the electrode assembly 31 therebetween. The electrode assembly 31 accommodated inside the pouch of the secondary battery 30 is fixed by the lower plate 21 and the upper plate 22, so that even if a volume change occurs due to gas generation inside the pouch, the temperature of the secondary battery 30 may be accurately measured.

The temperature measuring device 200 according to an embodiment of the present disclosure includes a temperature measuring member 40 configured to measure the temperature of the secondary battery 30. In addition, the jig 20 includes a hole 50 accommodating the temperature measuring member 40.

The temperature measuring member 40 measures the temperature of the secondary battery 30. The temperature measuring member 40 may be disposed adjacent to the secondary battery 30 to sense the internal temperature of the secondary battery 30. The temperature measuring member 40 measures the surface temperature of the secondary battery 30, which may be defined as the internal temperature of the secondary battery 30.

The temperature measuring member 40 is accommodated in the hole 50 formed in the jig 20. Conventionally, in order to measure the temperature of the secondary battery, the temperature measuring member was attached to the terrace part between the electrode tap and the jig, but due to gas generation inside the secondary battery, the temperature measuring member attached to the terrace part was easily removed. In order to solve this problem, the temperature measuring device 200 according to the present disclosure accommodates the temperature measuring member 40 inside the hole 50 formed in the jig 20, thereby having an effect of stably and accurately measuring the temperature of the secondary battery 30 even if the volume of the pouch changes due to the gas generated inside the pouch accommodating the electrode assembly 31.

The temperature measuring member 40 may be adhered to the inner surface of the hole 50 by a heat-resistant tape. The temperature measuring member 40 is firmly adhered to the surface of the jig 20 or the secondary battery 30 by the heat-resistant tape, thereby having an effect of more stably and accurately measuring the temperature of the secondary battery 30 even if the volume of the pouch changes due to the gas generated inside the pouch.

The type of heat-resistant tape is not particularly limited, but a polyimide tape having insulating properties, solvent resistance, and no adhesive residue when peeled off may be used. The temperature measuring member 40 may include a connecting member 41, and the connecting member 41 may be drawn out to the outside of the hole 50. The temperature measuring member 40 accommodated inside the hole 50 may be easily detached by the connecting member 41 attached to the temperature measuring member 40. As a result, the temperature measuring member 40 may be attached to a part of the secondary battery 30 where temperature measurement is required, and there is an effect of checking the temperature difference by attaching the temperature measuring member 40 to different parts of the secondary battery 30 as needed.

The hole 50 may be formed in at least a part of the lower plate 21 and the upper plate 22 adjacent to the electrode tab 32, 33. The electrode tab 32, 33 include a cathode tab 32 and an anode tab 33, and the temperature measuring member 40 may be accommodated in the hole 50 adjacent to the cathode tab 32. By accommodating the temperature measuring member 40 in the hole 50 adjacent to the cathode tab 32, there is an effect of quickly and accurately measuring the temperature increase occurring at the cathode included in the electrode assembly 31.

The electrode tab 32, 33 may be electrically connected to the electrode assembly 31. The electrode tab 32, 33 may extend to the outside of the pouch accommodating the electrode assembly 31 to become an electrode terminal. For example, the cathode tab 32 electrically connected to a plurality of cathodes may be a cathode terminal, and the anode tab 33 electrically connected to a plurality of anodes may be an anode terminal. In FIG. 2, the electrode tabs 32, 33 are illustrated as being formed on different sides, but are not limited thereto and may be formed on the same side.

Figure 3:
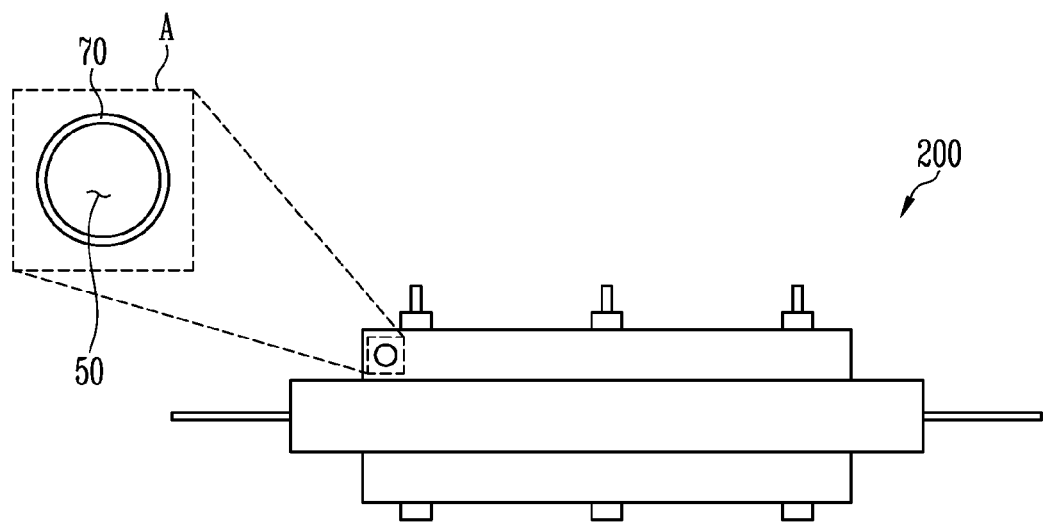
FIG. 3 is an enlarged view of a structure of a hole formed with a thermally conductive polymer in a temperature measuring device in accordance with an embodiment of the present disclosure.

FIG. 3 is an enlarged view of a structure of a hole formed with a thermally conductive polymer in a temperature measuring device in accordance with an embodiment of the present disclosure.

Referring to FIG. 3, a thermally conductive polymer 70 may be formed on at least a part of the outer periphery and inner surface of the hole 50. In addition, the temperature measuring member 40 may be adhered to the thermally conductive polymer 70. The temperature measuring member 40 may be adhered to the hole 50 by the thermally conductive polymer 70 without heat-resistant tape, and may be adhered to the hole 50 by the heat-resistant tape and the thermally conductive polymer 70, if necessary.

The thermally conductive polymer 70 formed on at least a part of the outer periphery and inner surface of the hole 50 may immediately transfer the heat generated by the secondary battery 30 to the temperature measuring member 40 accommodated inside the hole 50. In addition, since the temperature measuring member 40 may be stably fixed inside the hole 50 by adhering the temperature measuring member 40 on the thermally conductive polymer 70, there is an effect of accurately measuring the temperature of the secondary battery. In addition, the thermally conductive polymer 70 has the effect of preventing corrosion of the hole 50, which is a thermally conductive metal material.

The type of thermally conductive polymer 70 is not particularly limited, but may be, for example, a high-molecular plastic polymer having a thermal conductivity of 1 W/mK or more, and may include a composite material in which fillers such as silicon oxide, aluminum oxide, boron nitride, aluminum nitride, magnesium oxide, anhydrous magnesium carbonate, and magnesium hydroxide are mixed.

FIGS. 4A to 4D schematically illustrate temperature measuring devices including holes of various structures.

Figures 4A, 4B, 4C, 4D:
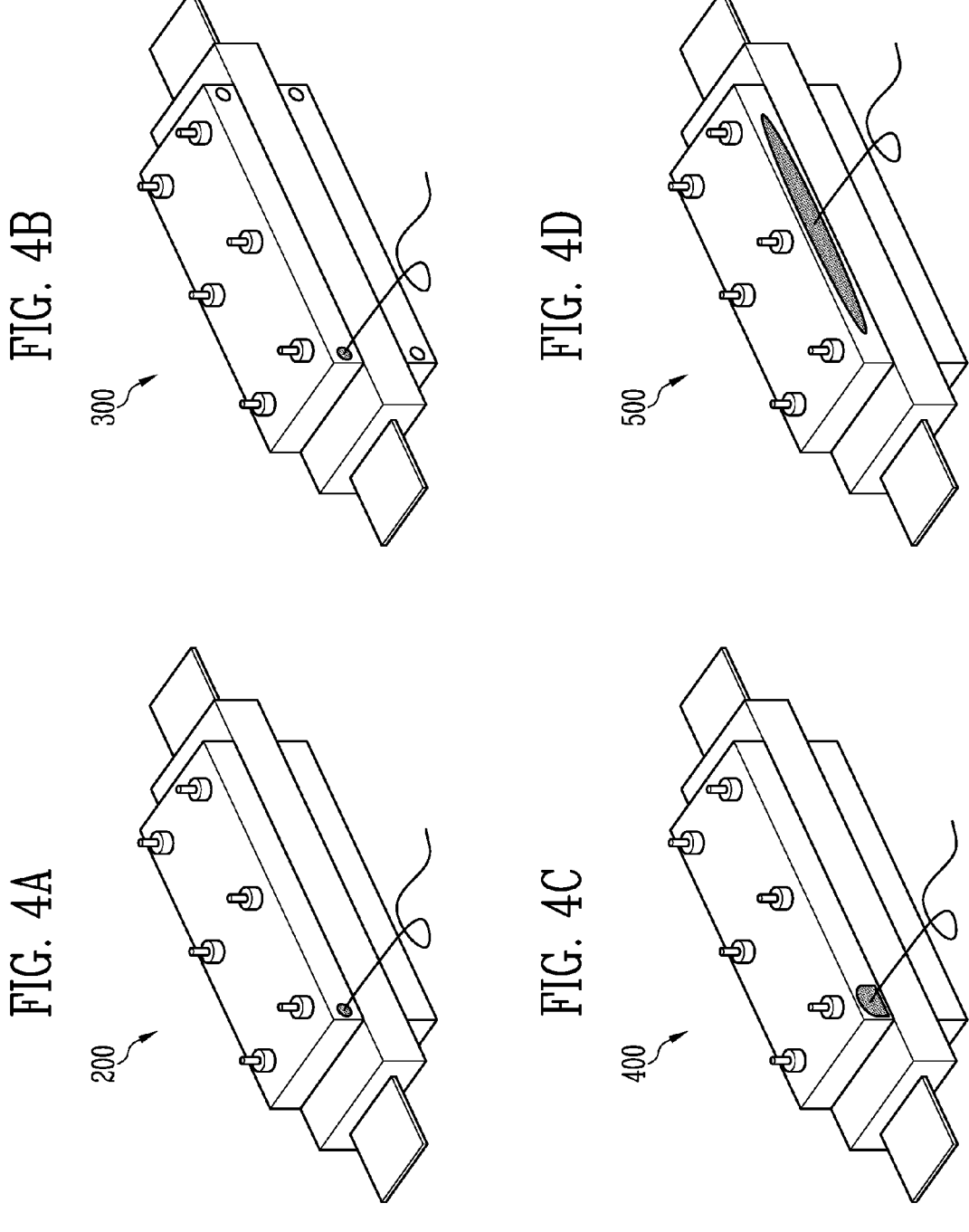
FIGS. 4A to 4D schematically illustrate temperature measuring devices including holes of various structures.

Referring to FIGS. 2, and 4A to 4D, the temperature measuring device 200, 300, 400, 500 according to the present disclosure may include at least one or more holes 50. The temperature measuring member 40 may be accommodated in only one hole 50 among the plurality of holes 50, or the plurality of temperature measuring members 40 may be accommodated in the plurality of holes 50 as needed. FIG. 4B illustrates four holes 50 formed on one side of the lower plate 21 and the upper plate 22, but is not limited thereto, and the holes 50 may be formed on one side and the other side of the lower plate 21 and the upper plate 22, or less than 4 or more than 4 holes 50 may be formed.

In the temperature measuring device 200, 300, 400, 500 according to the present disclosure, the cross section of the hole 50 may include at least one shape of a polygon or a curve. For example, the cross section of the hole 50 may have a triangular, quadrangular, or semicircular shape. In addition, the hole 50 may be formed at a location spaced apart from the secondary battery 30 by a predetermined distance, and may be formed at a location in contact with the secondary battery 30 as needed. When the hole 50 is formed at a location in contact with the secondary battery 30, the temperature measuring member 40 may contact the surface of the secondary battery 30, thereby having an effect of directly measuring the temperature of the secondary battery 30.

In the temperature measuring device 200, 300, 400, 500 according to the present disclosure, the hole 50 may be formed in the central part of the upper plate 22. FIG. 4D illustrates a hole 50 formed on one side of the central part of the upper plate 22, but is not limited thereto, and the holes 50 may be formed on one side and the other side of the central part of the upper plate 22, or holes 50 may be formed on one side and the other side of the central part of the upper plate 22 and the lower plate 21. When the hole 50 is formed in the central part of the upper plate 22, there is an effect of increasing convenience when moving the jig 20 using the hole 50 or clamping the secondary battery 30 between the jig 20.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A secondary battery temperature measuring device, comprising:
   a jig configured to pressurize a secondary battery; and
   a temperature measuring member configured to measure a temperature of the secondary battery,
   wherein the jig comprises a hole configured to accommodate the temperature measuring member,
   wherein the jig comprises a lower plate on which the secondary battery is seated and an upper plate configured to pressurize the secondary battery from an upper part,
   wherein the secondary battery comprises an electrode assembly and an electrode tab extending from the electrode assembly, and the lower plate and the upper plate clamp the electrode assembly, and
   wherein the electrode tab is drawn out to an outside of the upper plate and the lower plate.

2. The secondary battery temperature measuring device of claim 1, wherein the upper plate and the lower plate are formed to comprise a thermally conductive metal material.

3. The secondary battery temperature measuring device of claim 1, wherein the upper plate comprises a fixing member configured to fix the secondary battery.

4. The secondary battery temperature measuring device of claim 1, wherein the temperature measuring member is adhered to an inner surface of the hole by a heat-resistant tape.

5. The secondary battery temperature measuring device of claim 1, wherein the temperature measuring member comprises a connecting member, and the connecting member is drawn out to an outside of the hole.

6. The secondary battery temperature measuring device of claim 1, wherein the hole is formed in at least a part of the lower plate and the upper plate adjacent to the electrode tab.

7. The secondary battery temperature measuring device of claim 1, wherein the electrode tab comprises a positive electrode tab and a negative electrode tab, and the temperature measuring member is accommodated in the hole adjacent to the positive electrode tab.

8. The secondary battery temperature measuring device of claim 1, wherein a thermally conductive polymer is formed on at least a part of an outer periphery and an inner surface of the hole.

9. The secondary battery temperature measuring device of claim 8, wherein the temperature measuring member is adhered to the thermally conductive polymer.

10. The secondary battery temperature measuring device of claim 1, wherein at least one or more of the holes are provided.

11. The secondary battery temperature measuring device of claim 1, wherein a cross section of the hole comprises any one or more shapes of a polygon and a curve.

12. The secondary battery temperature measuring device of claim 1, wherein the hole is formed in a central part of the upper plate.

13. The secondary battery temperature measuring device of claim 1, wherein the temperature measuring member is in contact with the secondary battery.

* * * * *